United States Patent [19]

Jansen-Herfeld

[11] Patent Number: 4,584,920

[45] Date of Patent: Apr. 29, 1986

[54] CIRCULAR SAW BLADE

[75] Inventor: Roettger Jansen-Herfeld, Remscheid, Fed. Rep. of Germany

[73] Assignee: Richard Jansen GmbH, Remscheid, Fed. Rep. of Germany

[21] Appl. No.: 698,626

[22] Filed: Feb. 6, 1985

[30] Foreign Application Priority Data

Feb. 15, 1984 [DE] Fed. Rep. of Germany ....... 3405407

[51] Int. Cl.⁴ ............................................. B23D 61/02
[52] U.S. Cl. ........................................ 83/838; 83/835; 83/698; 407/30; 407/52
[58] Field of Search ................. 83/838, 844, 664, 665, 83/676, 698, 835; 76/112; 51/206.4, 206.5; 407/30, 33, 52; 403/364, 333, 334

[56] References Cited

U.S. PATENT DOCUMENTS 21,651 10/1858 Carpenter .............................. 83/838
1,526,861 2/1925 Manderscheld ..................... 51/206.4

Primary Examiner—James M. Meister
Attorney, Agent, or Firm—Michael J. Striker

[57] ABSTRACT

A circular saw blade is subdivided into two sectors by a serpentine-shaped interruption cut so that at least one noise-damping slot is formed between the two sectors. The serpentine cut forms in the two sectors projections alternating with recesses. The projections of one sector are received in the recesses of the opposite sector. The adjacent projections of the opposite sectors are spaced from each other in the regions of their backsides. The spacing between the backsides of the opposite projections increases towards a central bore of the saw blade.

7 Claims, 2 Drawing Figures

CIRCULAR SAW BLADE

BACKGROUND OF THE INVENTION

The present invention pertains to a circular saw blade which is provided with at least one slot of a very small width, extended radially from a central bore to the periphery of the saw blade to reduce noise during the operation of the blade.

Circular saw blades of the type under discussion have been known in the art. The noise decrease during the operation of such saw blades has been obtained because the saw blade has been subdivided into a plurality of sectors by narrow slots to reduce oscillations, and, on the other hand, to avoid sound oscillations at the spots of contact between the sectors due to friction. Such saw blades have the disadvantage that wear at the spots of contact in the region of the slots between the sectors occurs because of continuous friction and therefore friction effect in a short period of time is not longer sufficient to avoid sound oscillations.

SUMMARY OF THE INVENTION

It is an object of the present invention to provide a circular saw blade with improved sound-damping properties.

It is another object of the present invention to provide a saw blade, in which a friction action between the spots of contact of the sectors subdivided by narrow slots would be obtained by a uniform continuous pressure of the opposing contact surfaces relative to each other during the entire service life of the saw blade. Such an effect is obtained because the saw blade is subdivided into at least two sectors by a serpentine interruption line.

The objects of this invention are attained by a circular saw blade having a central bore and a toothed peripheral edge, said saw blade being subdivided into at least two individual sectors by as least one interruption cut extended substantially from said peripheral edge to said central bore to form between said sectors at least one sound-damping slot, said interruption cut having a serpentine shape and forming in each sector a plurality of projections alternating with recesses, said sectors being arranged opposite to each other so that the projections of one sector are received in the recesses of the other sector, each of said projections including a wider portion, a narrower portion and an intermediate portion between said wider and narrower portion, the intermediate portions of the projections of one sector lying against the intermediate portions of the projections of the other sectors and being spaced from each other at a narrow distance, said distance increasing in the direction towards said central bore.

The interruption cut may subdivide the saw blade into more than two individual sectors.

The interruption cut may have a straight portion laterally of and near said central bore.

The individual sectors may be connected to each other by rivets.

The individual sectors may be connected to each other in a form-locking manner by clamping means.

The individual sectors may be connected to each other by welding in a spot-like fashion.

The individual sectors may be also connected to each other by soldering in a spot-like fashion.

It should be noted that due to centrifugal forces acting on the surfaces of the intermediate portions of the projections of the opposite sectors of the saw blade these sectors are under continuous pressure during the operation of the saw blade. Despite the fact that wear of those surfaces can eventually occur the sound energy would always be transmitted into a friction heat.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
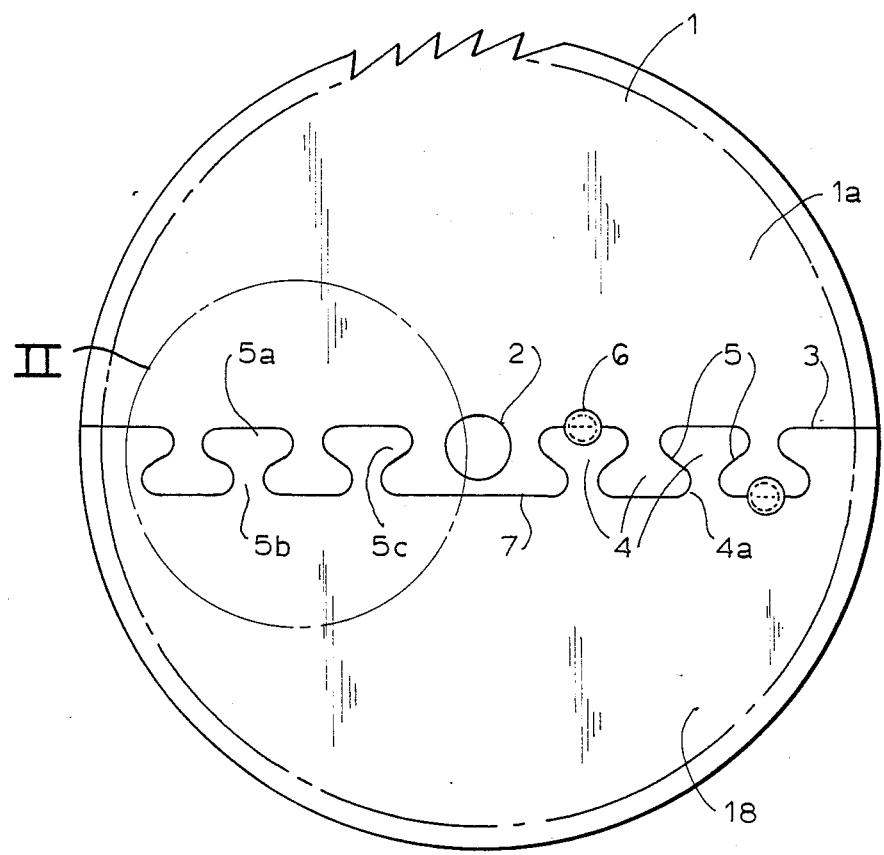
FIG. 1 is a side view of the circular saw blade according to the invention.

Referring now to the drawings in detail reference 1 designates a saw blade. Saw blade 1 has a central bore 2. A plurality of saw teeth are formed in the known fashion on the peripheral edge of the saw blade. The saw blade is subdivided into two individual portions or sectors 1a and 1b by a serpentine interruption cut 3 which forms in each sector a plurality of projections 4 alternating with respective recesses 4a. The serpentine cut 3 has in the region of central bore 2 a straight line portion 7. A sound-damping slot of a serpentine shape and having a very narrow width is defined between two sectors 1a and 1b by cut 3. Each projection 4 of each sector has a wider portion 5a, narrower portion 5b, and an intermediate portion 5c extended between the narrower portion and the wider portion. As shown in FIG. 1, the projections 4 of one sector are received in the corresponding recesses of the opposite sector of the saw blade.

Two individual sectors can be connected to each other by rivets 6. Suitable clamping means connecting sectors 1a and 1b to each other can be utilized. Welding or soldering can be also used to connect sectors 1a and 1b to each other.

In the preferred embodiment serpentine interruption cut extends approximately over the central diameter of the saw blade. The central straight-line portion 7 of the interruption line is laterally displaced relative to the central bore in order not to affect the accuracy of the central bore.

Figure 2:
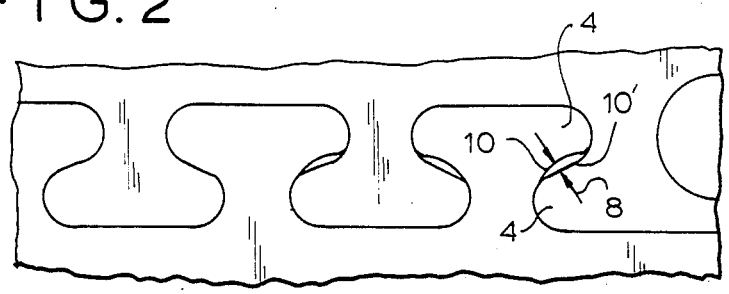
FIG. 2 is a partial enlarged view of the portion II of FIG. 1.

With reference to FIG. 2 it is seen that in the region of the intermediate portions of two opposing projections 4 of sectors 1a and 1b these intermediate portions 5c are spaced from each other. The spacing between the surfaces of the opposite intermediate portions of two adjacent projections of sectors 1a and 1b at the periphery of the saw blade is almost zero; this spacing denoted by reference number 8, however increases towards the central bore 2 as will be explained hereinafter.

In order to shift pressures caused by centrifugal forces acting on the opposite surfaces of the projections 4 of the opposing sectors of the saw blade, during the operation of the latter, as far as possible in the direction of the peripheral region of the saw blade the sectors with projections 4 are so formed that the spacing 8 between the opposite backside surfaces 10 and 10' increases in the direction towards the central bore 2 and is maximal near the central bore.

A plurality of slots of serpentine shape, all extended radially of the central bore, can be formed in the saw blade by a number of radial serpentive cuts so that the saw blade would be subdivided into more than two sectors. To prevent symmetrical oscillations three, or five, or seven sectors in the saw blade would be specifically advantageous.

It will be understood that each of the elements described above, or two or more together, may also find a useful application in other types of circular saw blades differing from the types described above.

While the invention has been illustrated and described as embodied in a circular saw blade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A circular saw blade having a central bore and a toothed peripheral edge, said saw blade being subdivided into at least two individual sectors by at least one interruption cut extended substantially from said peripheral edge to said central bore to form between said sectors at least one sound-damping slot, said interruption cut having a serpentine shape and forming in each sector a plurality of projections alternating with recesses, said sectors being arranged opposite to each other so that the projections of one sector are received in the recesses of the other sector, each of said projections including a wider portion, a narrower portion, and an intermediate portion between said wider and narrower portion, each intermediate portion of the projection of one sector facing a corresponding intermediate portion of an adjacent projection of the other sector, the intermediate portions of the projections of two opposite sectors being spaced from each other at a distance, said distance increasing in the direction towards said central bore so that the distances between the intermediate portions of the projections which are close to the periphery of the blade are zero and the distance between the intermediate portions of the projections which are positioned near the central bore is maximal.

2. The saw blade as defined in claim 1, wherein said interruption cut subdivides the saw blade into more than two individual sectors.

3. The saw blade as defined in claim 1, wherein said interruption cut has a straight line portion extended laterally of and near said central bore.

4. The saw blade as defined in claim 4, wherein said individual sectors are connected to each other by rivets.

5. The saw blade as defined in claim 3, wherein said individual sectors are connected to each other in a form-locking manner by clamping means.

6. The saw blade as defined in claim 4, wherein said individual sectors are further connected to each other by welding in a spot-like fashion.

7. The saw blade as defined in claim 4, wherein said individual sectors are further connected to each other by soldering in a spot-like fashion.

* * * * *